United States Patent [19]

Petersen

[11] 4,433,273

[45] Feb. 21, 1984

[54] CAMERA MOTOR BELT DRIVE SYSTEM

[75] Inventor: Christian C. Petersen, Westwood, Mass.

[73] Assignee: Polaroid Corporation, Cambridge, Mass.

[21] Appl. No.: 341,202

[22] Filed: Jan. 21, 1982

[51] Int. Cl.³ .................... H02K 4/00; H02K 7/06; G03B 1/22; G03B 17/50

[52] U.S. Cl. ........................ 318/135; 318/9; 310/37; 310/20; 226/67; 354/86

[58] Field of Search .............. 318/9, 14, 135, 443, 318/556; 310/36–38, 20–24, 14; 354/86, 241; 198/854, 857–859, 804, 832, 736, 738, 740; 242/206, 209, 210; 226/62–63, 64, 67, 158, 161, 162

[56] References Cited

U.S. PATENT DOCUMENTS

| 464,063 | 12/1891 | Collom | 310/14 |
|---|---|---|---|
| 599,670 | 2/1898 | Harrison | 354/241 |
| 1,132,445 | 3/1915 | Conrad | 310/14 |
| 1,396,335 | 11/1921 | McDonald | 310/21 |
| 2,931,284 | 4/1960 | Vinten | 354/241 |
| 3,279,666 | 10/1966 | Graves | 226/67 |
| 3,575,650 | 4/1971 | Fengler | 318/135 |
| 3,889,280 | 6/1975 | Biber | 354/86 |
| 4,030,111 | 6/1977 | Kimura | 354/213 |
| 4,194,821 | 3/1980 | Stemm et al. | 354/86 |
| 4,292,892 | 10/1981 | Combs | 198/859 |

*Primary Examiner*—J. V. Truhe
*Assistant Examiner*—A. Evans
*Attorney, Agent, or Firm*—David R. Thornton

[57] ABSTRACT

A stepper drive system including a pair of linear belt flights trained between interior surfaces of a fixed frame and a reciprocable armature carriage with the belts alternately clamped to the carriage so as to successively advance the belt flights in opposite directions. The armature carriage is powered by a linear motor defined by a pair of permanent magnets fixed to the carriage and at least one, preferably two, electrically conductive coils fixed in the frame such that when energized the armature carriage will be driven in one of two directions along a given path between fixed stops established by the frame. To clamp the belt flights to the carriage, an energizeable belt gripping device is mounted on the carriage and includes a reciprocable armature fitted with belt deforming nipples, aperture engaging pins, or a planar surface for friction engagement. Alternately, the belt flights may be also coated with a magnetically permeable material so as to be electromagnetically drawn against the belt clamp.

14 Claims, 6 Drawing Figures

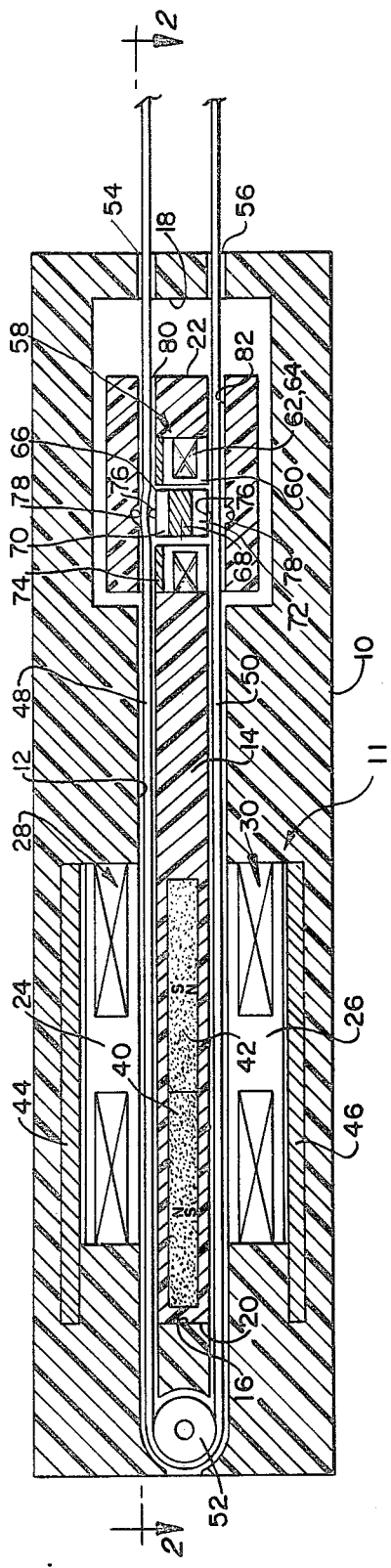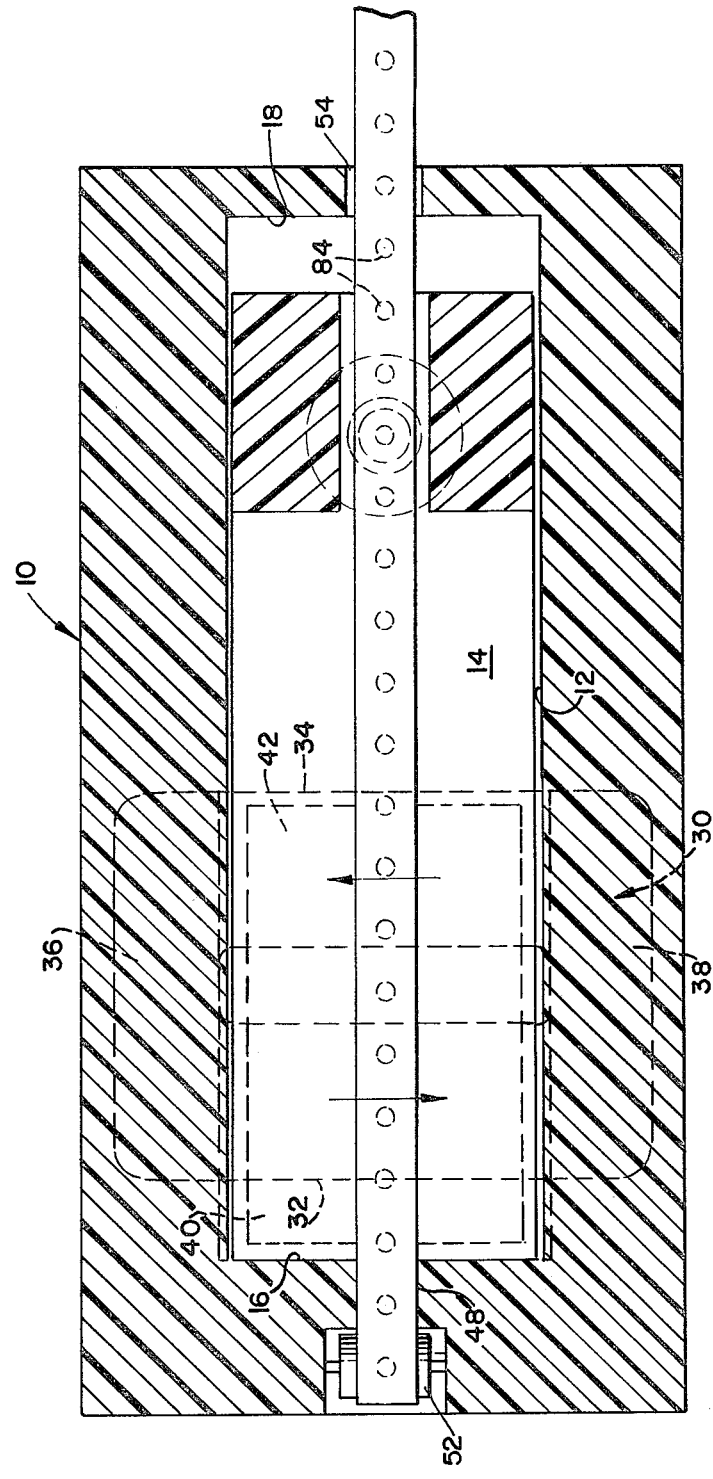
FIG. 1.
FIG. 2.

CAMERA MOTOR BELT DRIVE SYSTEM

BACKGROUND OF THE INVENTION

This invention relates to linear motor drives, and more particularly, to incremental or stepper drives in which a power transmitting belt or equivalent is advanced incrementally through precisely dimensioned successive steps by reciprocal dynamoelectric linear motor.

Stepper motors are well known and widely used in applications where a driven member is required either to be accurately positioned at specific increments or steps or to be synchronized for movement in steps corresponding to a related system or to a particular program. Such motors may be mechanical, electromagnetic or electromechanical in nature and, because of the almost unlimited switching capabilities of presently available electronic circuitry, the latter two classes of stepper motors may be operated at speeds normally associated with continuous motor drives. The potential for precision with stepper motors may be appreciated by consideration of the finite nature of a digital system with the relatively subjective nature of an analog system.

A primary advantage of a stepper motor in which electromagnetic force is used both to initiate and to stop a drive output movement through successive steps is that overall drive speed and control is limited only by the switching speed of electronic control circuitry and the inertia of moving parts. In this latter respect, the required inertia for any drive system makes it difficult to establish the precise increment through which a stepper motor output will position a driven member or element. This problem is traditionally addressed by the addition of mechanical pawl and ratchet mechanisms which are effective for their intended purpose but tend to limit drive speed in the overall system.

In a commonly assigned, copending application Ser. No. 45,822, filed June 5, 1979 and entitled "Linear Actuator", a dynamoelectric linear motor is disclosed in which an armature having a magnetically permeable core and a pair of permanent magnets of rare earth materials such as samarium cobalt, is received within a generally cylindrical bobbin supporting a pair of electrically conductive field coils appropriately positioned in relation to the armature such that alternate energization of the coils will effect reciprocation of the armature. By providing simple abutment or limit stops at the opposite ends of armature travel, the distance or throw of reciprocal travel is established precisely. Also, by providing an iron disc or washer in fixed relation to the bobbin, the stopped position or step at which the motor comes to rest is inherently fixed. Such motors additionally optimize the magnetic flux characteristics of permanent magnets formed of rare earth materials and enable extremely high speed operation at high efficiencies in a very compact, virtually miniaturized motor package.

SUMMARY OF THE PRESENT INVENTION

In accordance with the present invention, a highly effective stepper drive system is provided in which the speed, precision and efficiency of a reciprocal linear motor are applied optimally to a low inertia belt transmission. The system is embodied physically in an extremely compact motor frame enclosing a drive motor having at least one field coil for actuating a reciprocating, permanent magnet armature or carriage situated between a pair of linear belt flights which may be opposite flights or runs of an endless belt or of a double ended belt, or separate flights on a pair of endless or double ended belts. The reciprocable carriage also supports a clamp motor such as a linear motor in which the armature is reciprocal in a path perpendicular to the path of the first-mentioned armature and functions to engage or alternately clamp, the belt runs or flights to opposite sides of the carriage. Both of the linear motors in the system may include magnetically permeable or ferrous member fixed in relation to the field coils either to drive the respective armatures in one direction or to effect a pre-established rest position where both of two field coils are de-energized.

A primary object of the present invention is, therefore, the provision of an extremely high speed, precise and efficient stepper drive system having a wide range of applications. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 1 is a vertical longitudinal cross-section centrally through an embodiment of the stepper drive system of the present invention;

FIG. 2 is a cross-section on line 2—2 of FIG. 1;

DETAILED DESCRIPTION OF THE PREFERRED EMBODIMENTS

Figure 3:
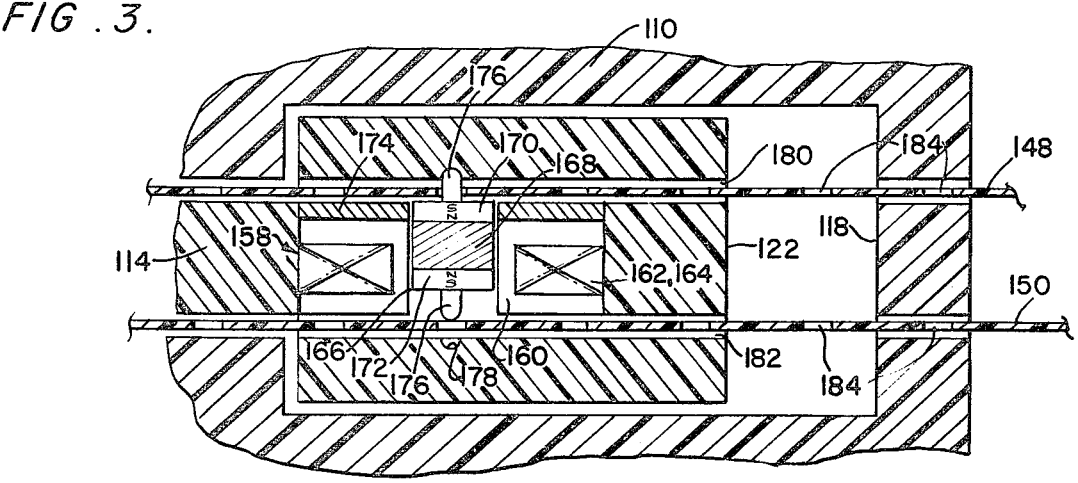
FIG. 3 is an enlarged fragmentary cross-section similar to FIG. 1 but showing an alternative embodiment of the invention.

In FIGS. 1 and 2 of the drawings, an embodiment of the stepper drive system of the present invention is shown to include a rectangular frame 10 formed of nonconductive, non-magnetic material, which encloses a drive motor 11 and a clamp motor 58. Although the frame may vary considerably in size, the contemplated exterior dimensions of the frame 10 in the illustrated embodiment are approximately 5 cm in length, 2.5 cm in width, and less than 1 cm in depth, the latter dimension being represented vertically in FIG. 1. Also, although the frame 10 is represented in the drawings as a one-piece structure, it is contemplated that in practice, the frame 10 will be formed as a fused or otherwise interconnected assembly of individually molded parts as will be readily understood by those skilled in the art from the overall structural organization of components supported by the frame and to be described in more detail below.

The frame 10 defines an interior, generally rectangular or linear cavity 12 within which a primary armature of the drive motor or carriage 14 is supported for reciprocable movement. As shown most clearly in FIG. 1, the limits or throw of such movement are determined by abutment stops 16 and 18 defined at opposite ends of the cavity 12 and engageable, respectively, by opposite ends 20 and 22 of the carriage 14. The body of the carriage 14 is preferably formed also of nonconductive, non-magnetic synthetic resinous material having a low coefficient of friction and dimensioned to be freely slidable in the cavity 12. Such sliding movement of the carriage may be facilitated by longitudinal guideways or guide rail projections (not shown) formed on either the carriage or on the longitudinal interior surfaces of the frame cavity 12.

At one end of the frame 10, a pair of essentially planar bobbins 24 and 26 are fixedly supported in the frame 10 so that the mutually facing ends thereof are substantially flush with the longitudinal surfaces of the cavity 12. The bobbins 24 and 26 support planar coils of conductive windings 28 and 30, respectively, which define an energizable field assembly. As shown most clearly in FIG. 2, the coils 28 and 30 are generally rectangular in configuration to define a pair of spaced linear runs or legs 32 and 34 extending transversely of the cavity 12 and of the carriage 14 and joined by end sections 36 and 38. Also, it will be noted that the linear runs 32 and 34 of the coils 28 and 30 are of a length to extend completely across the carriage 14 and so the the end sections 36 and 38 lie beyond the sides of the cavity 12.

Fixed within the primary armature or carriage 14 are a pair of adjacent rectangular permanent magnets 40 and 42 preferably of rare earth materials such as samarium cobalt. As shown in FIG. 2, the transverse dimension of the magnets 40 and 42 approximate the width of the armature 14 whereas the longitudinal dimension of each magnet is slightly larger than the corresponding dimension of the transverse runs or legs 32 and 34 of the respective coils 28 and 30. Also, it will be noted that the longitudinal dimension of the magnets, relative to the distance of armature travel and to the spacing between the transverse runs or legs 32 and 34 of the coils, is such that the adjacent edges or juncture between the magnets 40 and 42 will always lie within the spacing between the transverse coil runs 32 and 34. Finally, the polarity of both magnets 40 and 42 is aligned with the narrow dimension thereof, or vertically as shown in FIG. 1, and with the flux path of each magnet oppositely directed. In other words, the north pole of the magnet 40 is presented at the top surface thereof whereas the north pole of the magnet 42 is presented at the bottom rectangular surface thereof.

Spaced outwardly of the bobbins 24 and 26 and fixed in the frame 10 are a pair of magnetically permeable or soft iron plates 44 and 46. The plates 44 and 46 are rectangular and conform to the composite rectangular configuration of the magnets 40 and 42 plus the strobe length.

From the arrangement of the permanent magnets 40 and 42 and the iron plates 44 and 46, it will be appreciated that the direction of the magnetic field in FIG. 1 will be clockwise or vertically upward through the magnet 40 and vertically downward between the plates 44 and 46 in the region of the magnet 42. On the basis of well-known electromagnetic principles (such as the right hand rule), current travelling in the coil 28 in a counterclockwise direction as viewed from above in FIG. 1 will exert a force moving the armature 14 from the stop 16 toward the stop 18 in the frame 10. The passage of electric current through the coil 30 in a clockwise direction opposite that just noted for the coil 28 will exert a force driving the armature or carriage 14 from the stop 18 to the stop 16.

While the carriage 14 is preferably the moving element, it should be noted that the conductive windings could be utilized as such and that broadly the magnets 40 and 42 comprise a permanent magnet assembly while the bobbins 24, 26 and their coils 28, 30 comprise an energizable field assembly arranged for relative motion of one assembly with respect to the other along a given path between given limits. Moreover, magnets 40 and 42 could be fabricated as a single magnet and magnetized to form the appropriate pole faces as shown in FIG. 1.

Between opposite sides of the carriage 14 and those internal surfaces of the cavity with which the inner ends of the bobbins 24 and 26 are substantially flush, a pair of linear belt flights or runs 48 and 50 extend longitudinally of the frame 10. In the illustrated embodiment, the flights 48 and 50 are of a single drive belt trained about an idler roller 52 journalled for rotation at one end of the frame 10 and extend through slots 54 and 56 on opposite sides of the carriage 14 to the other end of the frame. Thus, the roller 52, in conjunction with the slots 54 and 56, serves as means for guiding the belt along opposite sides of, and in the direction of the path of movement of, the carriage 14. From the end, the belts extend from the frame 10 to a member (not shown) to be driven or for use of the belts themselves as operational elements. For example, the belts themselves may serve as a photographic film or tape strip or, alternatively, provide shutter or aperture determinations in camera operations. Although, as just indicated, the arrangement illustrated in FIGS. 1 and 2 is exemplary of a preferred embodiment, it is also contemplated that the belt flights 48 and 50 may be opposite flights either of an endless belt, a double ended belt, or flights of separate endless or double ended belts.

Near the end 22 of the carriage 14, a belt gripping clamp or clamp motor 58 is supported, and provides energizeable means for engaging or clamping the belt flights 48 and 50 to the carriage 14. The clamp motor 58 includes a bobbin 60 carrying a pair of circular coils 62 and 64 which are wound simultaneously to occupy the same area and which extend about a cylindrical armature 66 having a steel core 68 and a pair of permanent magnets 70 and 72, also preferably of rare earth materials such as samarium cobalt. The motor 58 is functionally similar to the linear motor disclosed in the aforementioned copending application Ser. No. 45,882, and as such, includes in the bobbin 60 an iron ring or washer 74 at one end to predetermine the position of the armature 66 when both coils 62 and 64 are in a de-energized state.

In the embodiment illustrated in FIG. 1, the armature 66 is provided at opposite ends with projecting nipples 76 movable into engagement alternately with the belt flights 48 and 50. The nipples 76 are aligned with recesses 78 formed in the surfaces of longitudinal slots 80 and 82 in the carriage 14, which surfaces are on the opposite side of the belt flights 48 and 50 from the armature 66. With such an arrangement, the nipples 76 may cooperate with the recesses 78 to grip the belt flights 48 and 50 either by elastic deformation of the belt flights or by engaging preformed embossments represented in FIG. 2 of the drawings by dashed line circles 84.

Figure 6:
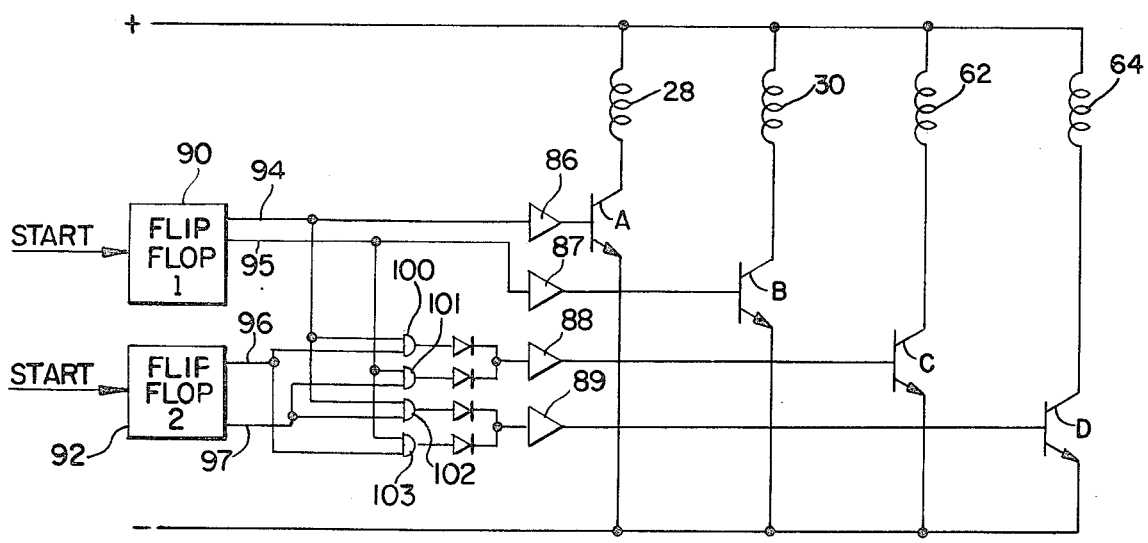
FIG. 6 is a schematic circuit diagram depicting an operation mode of the drive system of the present invention.

In FIG. 6 of the drawings, circuit means are illustrated for energizing the step motor system for reciprocal movement of the carriage 14 and the clamp motor 48 so as to synchronize movement of the carriage with appropriate belt engagement by the clamp motor 58, thereby advancing the belt through a succession of steps. For purposes of clarity, an elementary circuit is illustrated with basic electronic components for controlling operation of the drive system shown to include a power circuit in which the coils 28, 30, 62 and 64 are connected in parallel, each coil being in series with power switching NPN transistors A, B, C and D, respectively. Bias voltage for switching each transistor to an on condition is supplied by gates 86, 87, 88 and 89, respectively, from a switching circuit such as provided by flip flop units 90 and 92 in conjunction with "AND" gates 100, 101, 102 and 103. Of the latter, the pair of AND gates 100 and 101 control transistor C through gate 88 to clamp one side of the belt to the drive motor 11 while gates 102 and 103 control transistor D to clamp the other side of the belt.

In the above-noted circuit arrangement, one output 94 of flip flop 90 controls coil 28 of the drive motor 11 through gate 86 and also feeds AND gates 100 and 104. Similarly, the other output 95 of the flip flop 90 controls coil 30 and also feeds AND gates 101 and 103. In turn, one output 96 of flip flop 92 feeds both AND gates 100 and 103 while the other output 97 feeds both gates 101 and 102.

Consequently, if the flip flop 90 is stepped (toggled) by substantially synchronous pulse trains, and flip flop 92 held at a particular output state, the belt will step in one direction while inversion of the output of flip flop 92 will step the belt in the opposite direction. Assuming, for example, that both flip flops 90 and 92 are set such that outputs 94 and 96 are first positive or "1" at the same time, coils 28 and 62 will be energized; the latter through AND gate 100. Coils 30 and 64 would be deenergized during this time since outputs 95 and 97 are negative or "0" thereby maintaining gates 87 and 89 in an off condition; the latter resulting from the unequal input to AND gates 102 and 103.

As the output of flip flop 90 is inverted such that output 94 becomes "0" and output 95 becomes "1", de-energization of coils 28 and 62 occurs with energization of coils 30 and 64. The latter reverses the previous direction of the primary motor 11, but clamps the opposite side of the belt to thus continue stepping the belt in the selected direction. To drive the belt in the opposite direction, the outputs of flip flop 92 are inverted. This in turn shifts the phase of belt clamping versus the direction of movement of the motor 11.

Operation of the system may be understood by reference to the physical structure illustrated in FIGS. 1 and 2 taken in conjunction with the circuitry illustrated in FIG. 6. With the carriage 14 initially in the position shown in FIGS. 1 and 2 where the end face 20 is retained against the abutment 16, the coils 28 and 62 are simultaneously energized by imposing a bias voltage on the transistors A and C. The result is that the carriage 14 will be advanced to the end stop 18 with the armature 66 of the motor 58 gripping the belt flight 48. Thus, the belt flight 48 will be moved to the right in FIG. 1 by a step equal in distance to the throw or travel of the carriage 14. Because the belt flight 50 is of the same belt as the flight 48 in the illustrated embodiment, obviously the flight 50 will move in the opposite direction (to the left in FIG. 2) by the same distance. To initiate the next step, the coils 28 and 62 are de-energized while the coils 30 and 64 are energized by imposing a bias voltage on the transistors B and D. In this state, the carriage will be driven from the stop 18 back to the stop 16 or its initial condition while the armature 66 in the motor 48 is engaged with the flight 50, thereby moving it to the left as viewed in FIG. 1. Repetitions of this operation will advance the belt in step increments in a clockwise direction as shown in FIG. 1. The armature 66 of the clamp motor 48 will be positioned by the iron disc 74 so that it remains in engagement with the belt flight 48 when all coils are de-energized. In should also be understood, however, that the clamp motor 58 can be made self-centering by, for example, placing the washer 74 at the center of the motor so as to release the belt upon each de-energization.

In FIG. 3 of the drawings, an alternative embodiment is illustrated in which components identical in structure or similar in structure but identical in function are designated by the same reference numerals but in a 100 series. Thus, in this instance, the clamp motor 158 supported by the carriage 114 includes essentially the same organization of the coils 162 and 164 as well as the armature 166. In this embodiment, the belt flights 148 and 150 are provided with spaced apertures 184 through which pin 176 carried by the armature 166 may extend to positively engage the belt flights. In all other respects, operation of the alternative embodiment is the same as the previously described embodiment.

Figure 4:
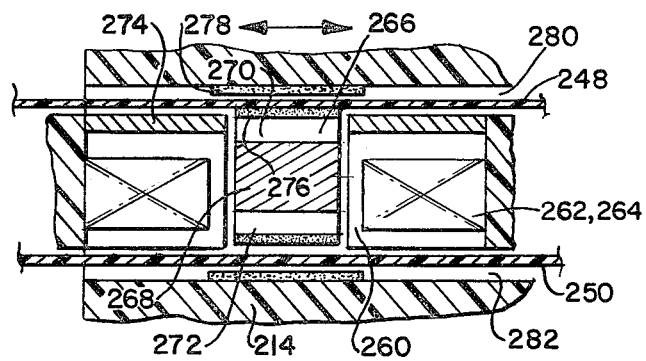
FIG. 4 is a fragmentary cross-section similar to FIG. 3, but showing a further alternative embodiment of the invention.

In FIG. 4, a further modification is shown in which the components previously described are designated by reference numerals bearing the same tens and digit numerals, but in a 200 series. Thus in this instance, the belt flights 248 and 250 are adapted to be engaged frictionally by planar friction pads 276 and 278 carried, respectively, by the armature 266 and by the carriage 214 on the opposite side of each of the belt flights from the armature 266. Here again, operation is essentially the same as that described with respect to the previous embodiment.

Figure 5:
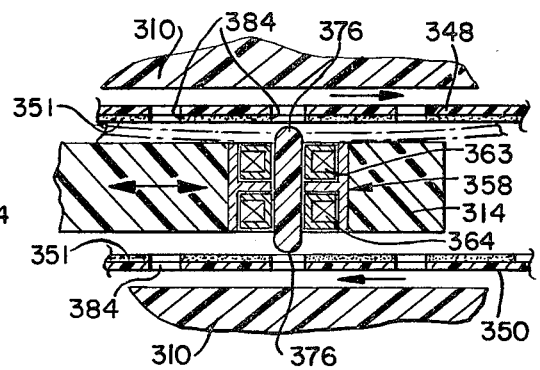
FIG. 5 is a fragmentary cross-section illustrating a still further embodiment of the invention.

In FIG. 5, a still further embodiment is shown in which the parts previously described are identified by reference numerals in a 300 series. Thus, the carriage 314 in this instance carries electromagnets 363 and 364. The belt flights 348 and 350 are provided with a magnetically permeable layer 351 and additionally provided with spaced apertures 384 Thus, coil 363 may be energized to draw the flight 348 (as shown in dotted lines) against the nipple 376 on one end of the electromagnet and then alternately energizing of coil 364 will draw the belt flight 350 against the nipple 376 on the other side of the carriage 114.

In the several embodiments, the organization of the magnets 40 and 42, the plates 44 and 46, and the coils 28 and 30 provide a highly efficient and extremely responsive linear motor to serve as the primary power source for driving the belt flights 48 and 50. The belt flights may be made of such materials as Mylar or other lightweight, high strength materials to keep the overall inertia of the system driving components at a minimum. The alternative forms of the secondary or belt engaging linear motor 58 are exemplified by the several illustrated embodiments. It is contemplated also that other electronically actuated types of arrangements could be used. For example, the belt engaging components might be in the nature of a piezo electric crystal energized by a coil or other circuitry operated in synchronism with the coils 28 and 30 to achieve the driving function described. In addition, the drive circuitry could be actuated under alternate programs to effect a reversal of the direction of belt flight drive or to provide variable stepping speeds, for example, by actuating the motor 58 every second, third or fourth (etc.) reciprocable cycle of the armature or carriage 14. Motor 58 would have a central or non-engaging position when not actuated for this application.

The described drive system is useful in many applications. In photographic cameras, for example, the stepper motor is capable of operation at speeds and with adequate precision to control film advance, lens focusing drives, shutter drives, aperture setting drives, reflex mirror drives, and scanning prisms or mirrors. In a more general sense, the drive system of the invention is contemplated for use in digital tape drives, print head drives for computer printers, and drives for reels of the type used in informational storage and retrieval.

In light of the foregoing, it will be appreciated that as a result of the present invention, a highly effective stepper belt drive system is provided by which the principal objective, among others are completely fulfilled. It will be apparent to those skilled in the art from the preceding description that many modifications and/or changes may be made in the illustrated and described embodiments without departure from the invention. Accordingly, it is expressly intended that the foregoing description is illustrative of preferred embodiments only, not limiting, and that the true spirit and scope of the present invention be determined by reference to the appended claims.

I claim:

1. A stepper drive system comprising:
   a frame, and
   a carriage mounted for reciprocable movement along a given path in said frame, said frame and carriage including a linear motor energizeable for reciprocally driving said carriage between given limits within said frame;
   at least one linear belt flight;
   means for guiding said belt flight longitudinally of said frame along at least a portion of both sides of said carriage;
   belt flight engaging means mounted on said carriage within said guided belt, said engaging means being selectively energizeable for engaging said belt flight at either side of said carriage; and
   means for energizing said motor and said engaging means for synchronizing movement of said carriage with operation of said belt engaging means to advance said one belt flight through a succession of steps upon continuous reciprocal carriage movement, said energizing means including means for energizing said engaging means to alternately engage said belt flight along opposing sides of said carriage in synchronism with the alternate direction of movement of said carriage.

2. The apparatus recited in claim 1, in which said linear motor means comprises:
   a permanent magnet armature having a pair of adjacent magnetized areas fixed to said carriage, the polarity of each of said magnetized areas being oppositely directed and perpendicular to the direction of carriage movement; and
   at least one electrically conductive coil fixed to said frame, said coil having a pair of spaced leg portions positioned respectively in the flux field of each of said magnetized areas and extending transversely of the direction of carriage movement and throughout the corresponding transverse dimension of said magnet.

3. The apparatus recited in claim 2, wherein the pole surfaces of said magnet armature are rectangular in shape, both dimensions of each pole surface thereof being substantially larger than the distance between opposite pole surfaces of each magnetized area thereby to provide a generally planar magnet configuration.

4. The apparatus recited in claim 3, wherein said coil legs are substantially planar in configuration, said apparatus further includes two of said coils, one on each side of said carriage, and a pair of magnetically permeable, generally flat plates fixed in said frame adjacent the outwardly facing end surfaces of said coils.

5. The apparatus recited in claim 4, wherein said frame defines at least one fixed stop and said magnetically permeable plates are displaced toward said one fixed stop so that said carriage will be positioned thereagainst due to magnetic attraction between said magnets and said magnetically permeable plates when said coils are de-energized.

6. The apparatus recited in claim 1, wherein said belt flight engaging means comprises electrically actuated means for connecting said one flight to said carriage on each side thereof, said electrically actuated belt flight engaging means comprising a second linear motor including a permanent magnet armature reciprocable transverse to the direction of carriage movement and between said linear belt flights to alternately engage said belt flight on each side of said carriage.

7. The apparatus recited in claim 6, wherein said armature includes belt deformation means on both ends adjoining said flight for engaging said one flight on each side of said carriage.

8. The apparatus recited in claim 6, wherein said belt flight is provided with linearly spaced apertures, and each adjoining end of said second linear motor armature includes a pin configured to engage one of said apertures so as to advance said flight.

9. The apparatus recited in claim 6, wherein said one flight includes magnetically attractable material and said electrically actuated means comprises a conductive coil oriented with the axis thereof perpendicular to said flight so that said flight is attracted to said coil upon appropriate application of current flow therein.

10. The apparatus recited in claim 9, wherein said one flight includes a magnetically permeable coating on one surface thereof.

11. A stepper drive system comprising:
    a linear motor having a permanent magnet armature assembly and an energizeable field assembly arranged for relative movement of one of said assemblies with respect to the other along a given path between given limits;
    means for coupling said motor to an energy source for energizing said motor for reciprocal movement of said one assembly along said given path;
    means for guiding said belt longitudinally along at least portions of both sides of said one assembly in the direction of said given path;
    energizeable means mounted on said one assembly for engaging said belt at either side of said one assembly; and
    means coupling said energizeable means to an energy source for energizing said engaging means to alternately engage said belt along opposing sides of said one assembly in synchronism with the alternate direction of movement of said one assembly to thereby advance said belt.

12. The apparatus of claim 11 wherein said one assembly is extended longitudinally, said engaging means is mounted transversely on the extended end of said one assembly and said belt extends over one transverse end of said engaging means and back beneath the other transverse end thereof.

13. The apparatus of claim 12 wherein said engaging means is a second linear motor.

14. The apparatus of claim 1 wherein said carriage includes a first portion carrying motor elements and a second portion extended in the direction of said given path, and said engaging means is a second linear motor mounted transversely to said first motor on the extended end of said carriage.

* * * * *